Figure 1A:
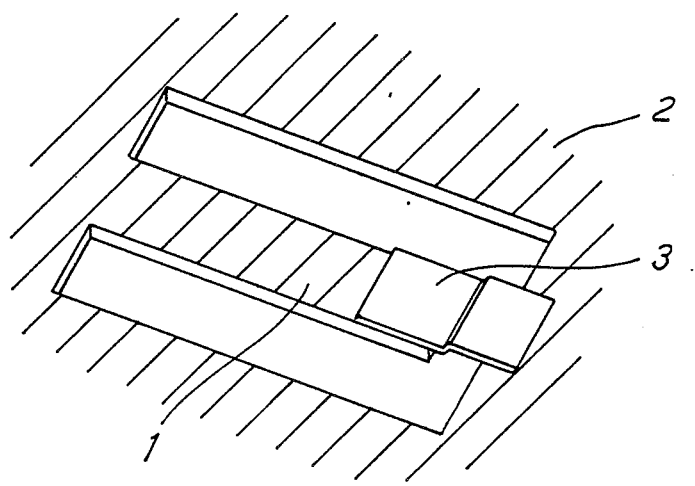

United States Patent [19]

Jepson et al.

[11] Patent Number: 4,938,053

[45] Date of Patent: Jul. 3, 1990

[54] FLUID METERING SYSTEM

[75] Inventors: Peter Jepson, Whitley Bay; Graham M. Tofield, Wincham, both of England

[73] Assignee: Thorn EMI Flow Measurement Limited, Stretford, England

[21] Appl. No.: 236,879

[22] Filed: Aug. 26, 1988

[30] Foreign Application Priority Data

Aug. 28, 1987 [GB] United Kingdom ............... 8720357

[51] Int. Cl.$^5$ .................. G01F 1/28; G01F 5/00; G01F 25/00

[52] U.S. Cl. .................. 73/3; 73/202; 73/861.74; 73/196

[58] Field of Search ........... 73/202, 202.5, 204.21, 73/861.02, 861.03, 861.19, 861.71, 861.74, 3, 195, 196

[56] References Cited

U.S. PATENT DOCUMENTS

| | | | |
|---|---|---|---|
| 3,314,290 | 4/1967 | Peranio | 73/202 |
| 3,559,482 | 2/1971 | Baker et al. | 73/202 |
| 4,351,192 | 9/1982 | Toda et al. | 73/861.74 X |
| 4,381,668 | 5/1983 | Sato et al. | 73/202.5 |
| 4,419,898 | 12/1983 | Zanker et al. | 73/861.02 |
| 4,454,758 | 6/1984 | Miller | 73/202 |
| 4,468,957 | 9/1984 | Sumal | 73/202 X |
| 4,527,423 | 7/1985 | Sato et al. | |
| 4,571,996 | 2/1986 | Wakeman et al. | |
| 4,599,907 | 7/1986 | Kraus et al. | 73/861.74 |
| 4,637,261 | 1/1987 | Kraus et al. | |

FOREIGN PATENT DOCUMENTS 0239703 10/1987 European Pat. Off. .
615506 2/1977 Switzerland .
1564156 12/1976 United Kingdom .

OTHER PUBLICATIONS

Wright, "The Coanda Meter-a Fluidic Digital Gas Flow Meter", in J. Phys. E: Sci. Inst., vol. 13, 1980, printed in Britain.
Class 73 Classification Definition, pp. 73-29 and 73-84, 9/86.

Primary Examiner—Herbert Goldstein
Attorney, Agent, or Firm—Fleit, Jacobson, Cohn, Price, Holman & Stern

[57] ABSTRACT

A fluid metering system includes a metering unit having a main flow channel and a bypass channel through which a portion of the total fluid flow through the unit is diverted, the bypass channel includes a fluid meter having means for monitoring a flow of fluid through the unit. The metering unit is optionally of modular construction including a number of components including a fluid meter.

5 Claims, 7 Drawing Sheets

FLUID FLOW

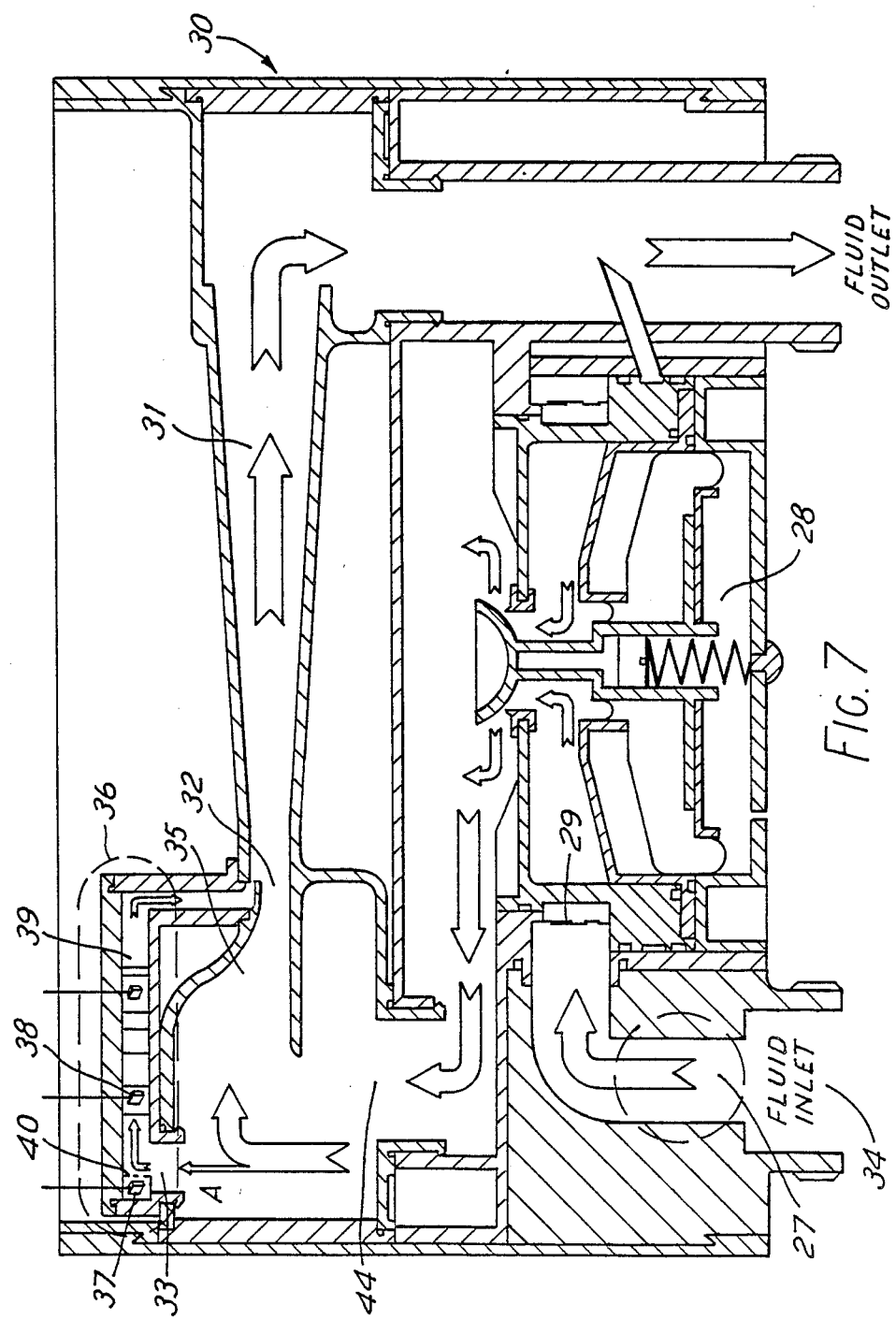

FLUID METERING SYSTEM

This invention is related to metering of fluids and, in particular, to a metering system suitable for use in domestic gas metering.

European patent application No. 86309946.1, published under U.S. Pat. No. 0239703 describes an example of a flow sensing device comprising a micro-engineered cantilevered beam fabricated on a semiconductor substrate and means sensitive to a characteristic of the beam which is indicative of fluid flow relative to the beam. The sensitive means may be a capacitive displacement sensor including a first electrode at the free end of the beam and a second electrode on the substrate below the first electrode, the sensor responding to a deflection of the beam relative to the substrate due to fluid flowing past the beam.

It is one object of the present invention to provide a fluid metering system which is capable to utilising micro-engineering techniques and in particular the cantilevered beam technology.

According to one aspect of the invention there is provided a fluid metering system which is of modular construction including a number of components including a fluid meter.

According to another aspect of the invention there is provided a fluid metering system including a metering unit having a main flow channel and a bypass channel through which a portion of the total fluid flow through the unit is diverted, the bypass channel including means for monitoring a flow of fluid through the unit.

The metering unit preferably includes means to establish a pressure drop across the bypass which is greater than the pressure drop between the inlet and the outlet of the metering unit.

In a preferred embodiment, said means includes a venturi and means to cause expansion of the fluid in the channel downstream of the venturi thereby to create a relatively low pressure drop across the metering unit as a whole.

Said monitoring means preferably includes micro-engineered sensors such as cantilevered beam flow sensors and density transducers.

The monitoring means is preferably a fluid meter comprising at least three sensing means, each having an output dependent on a respective characteristic of the fluid to be monitored, means to combine the outputs of two of said sensing means to provide a measurement of mass flowrate of the fluid, and to combine the outputs of the three sensing means to provide an error signal which can be used to recalibrate the measurement.

Figure 1B:
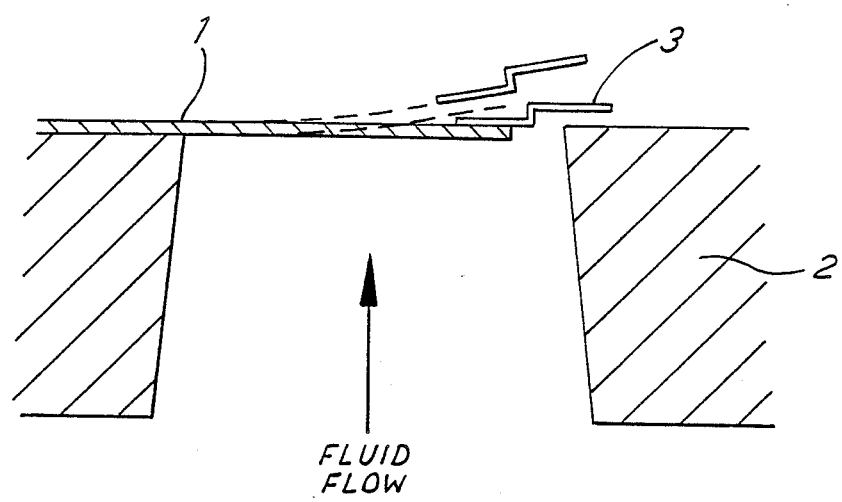
Figure 1C:
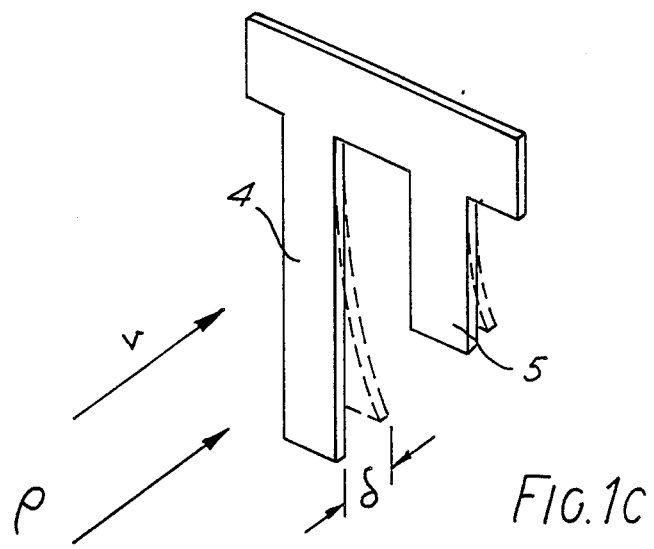
Figure 2:
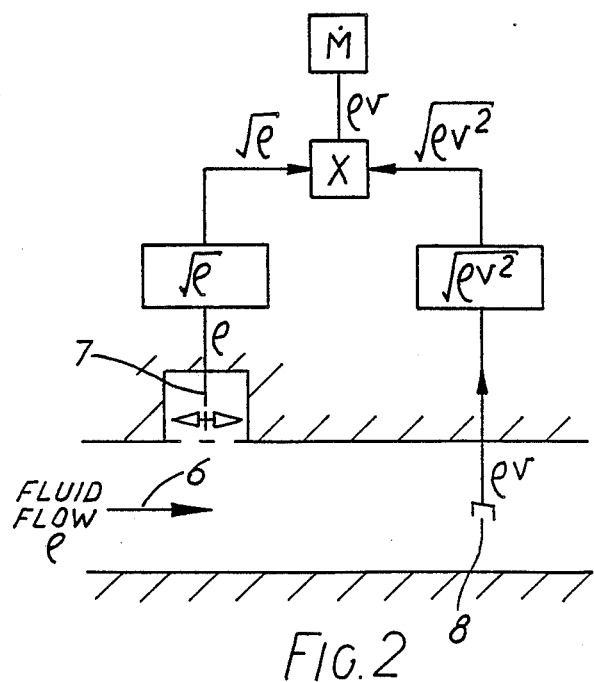
Figure 3A:
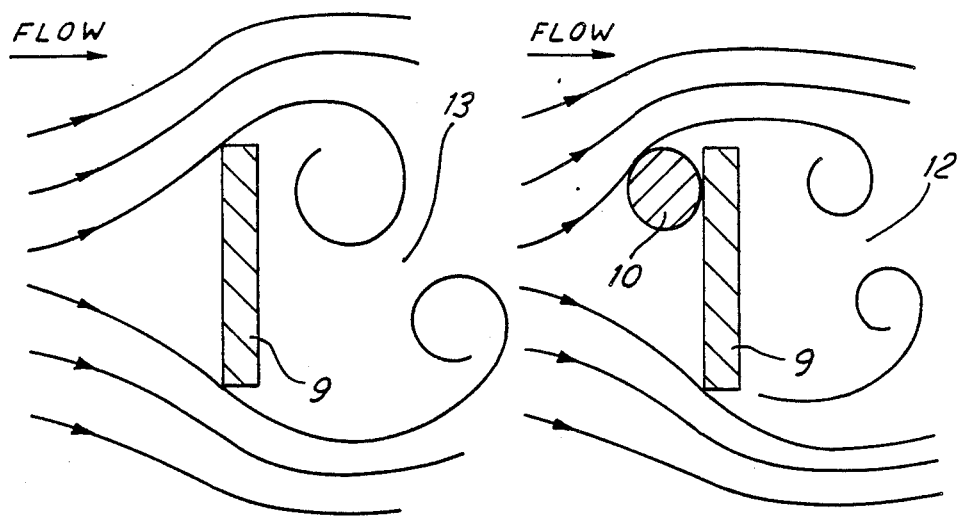
Figure 3B:
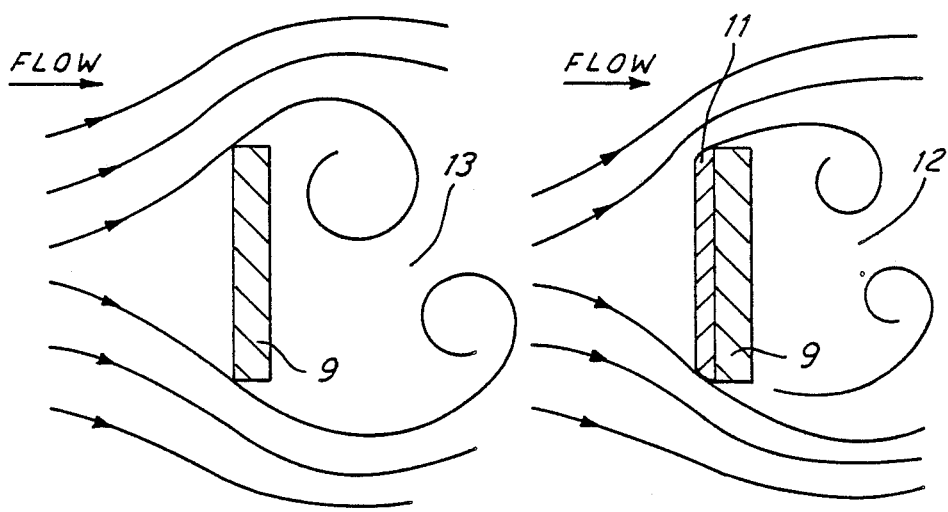
Figure 4:
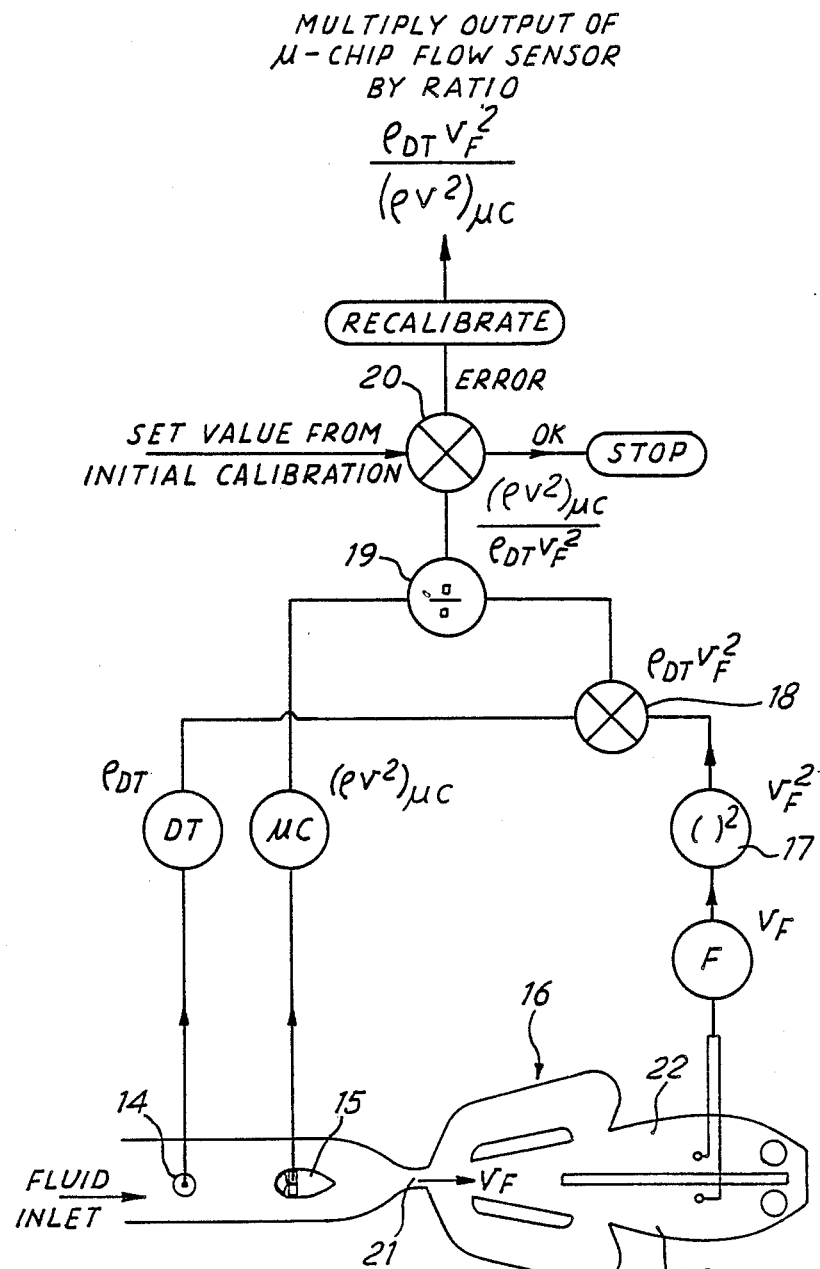
Figure 5:
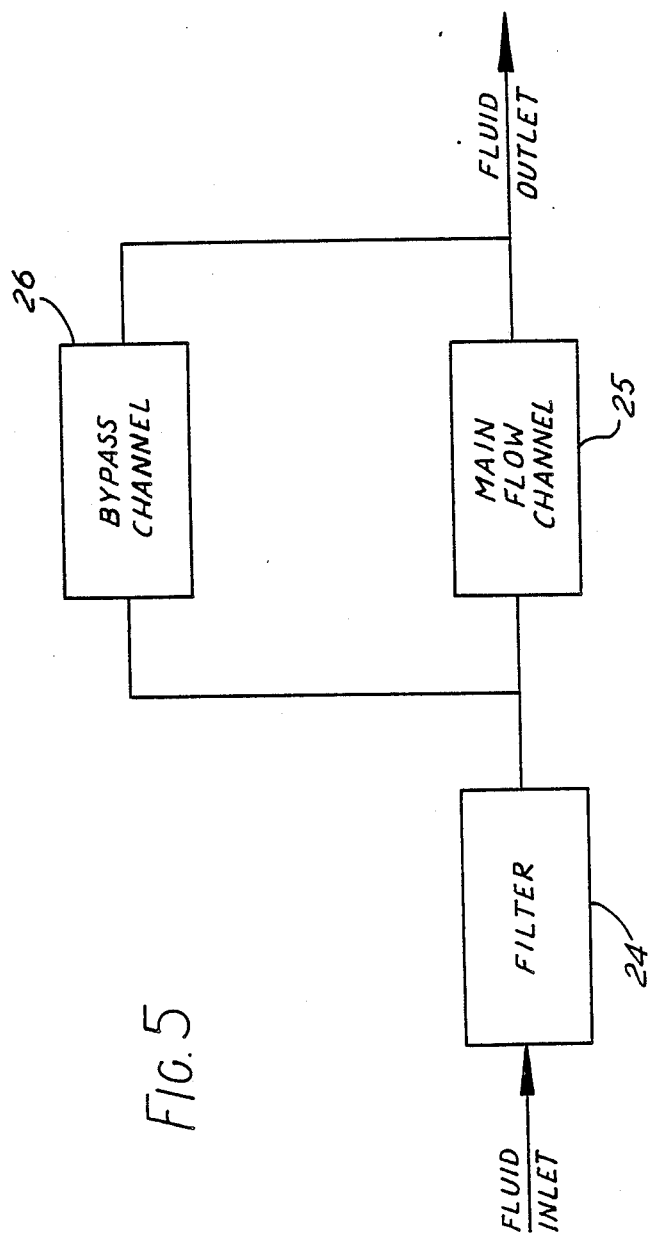
Figure 6:
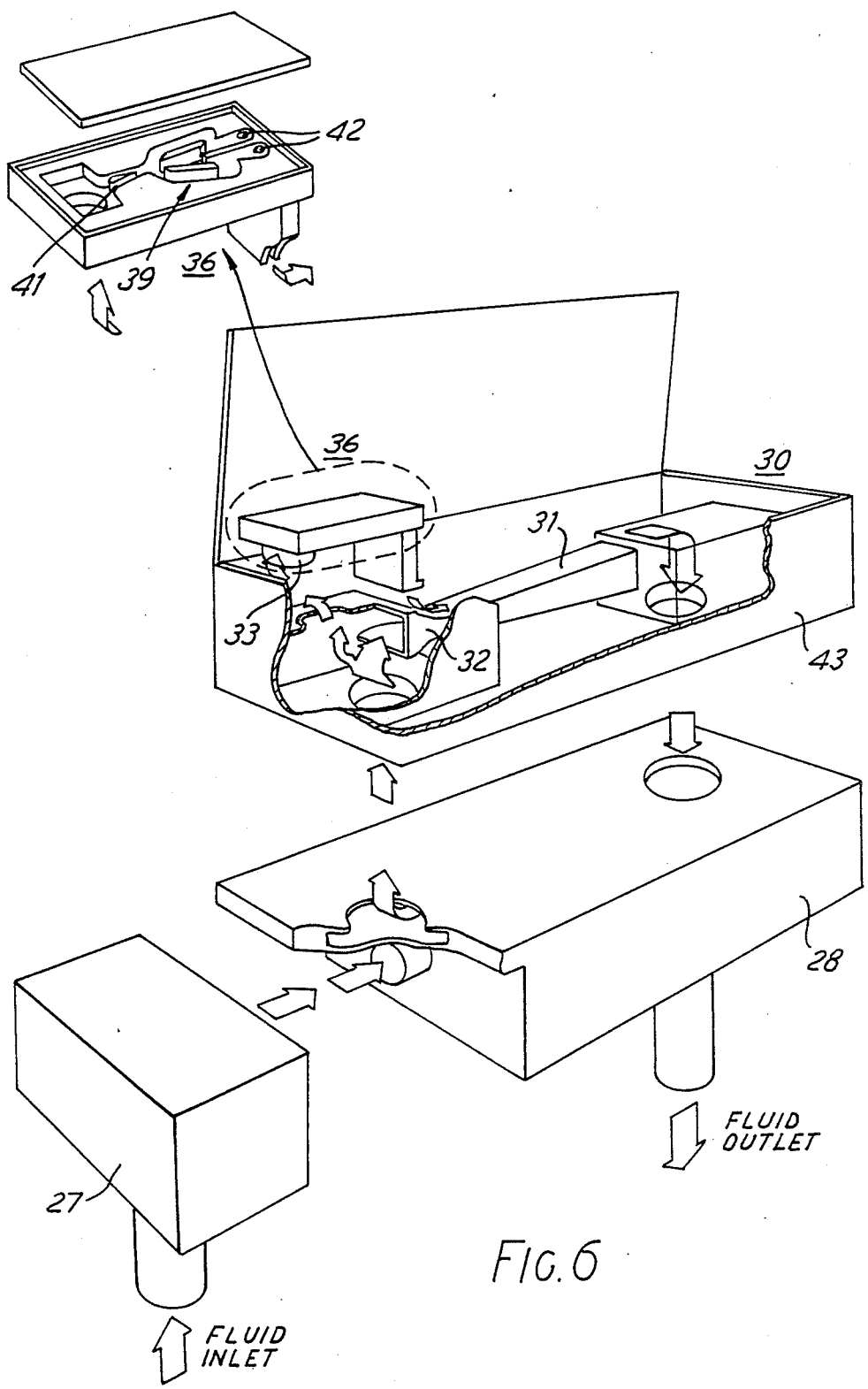

In order that the invention may be clearly understood and readily carried into effect, it will be described by way of example with reference to the accompanying drawings, of which:

FIGS. 1A to 1C represent a micro-engineered cantilevered beam flow sensor ("microbeam flow sensor") as described in European patent application No. 86309946.1, FIG. 2 shows a system using a microbeam flow sensor in conjunction with a density transducer, FIGS. 3A and 3B diagrammatically represent the effect of contamination on flow around a cantilever, FIG. 4 schematically represents a fluid meter suitable for use in a metering system in accordance with the present invention including suitable monitoring and calibration logic, FIG. 5 schematically represents a metering system in accordance with the present invention, FIG. 6 shows a modular metering system in accordance with the present invention, and FIG. 7 shows a cross section through the modular metering system of FIG. 6.

The fluid meter described hereinafter with reference to FIGS. 1 to 4 is the subject of our copending United Kingdom patent application No. 8720356, corresponding to U.S. patent appln. Ser. No. 07/237,389. Such a meter may be incorporated in a fluid metering system according to the present invention and is described herein so that it will be clear how it can be included in such a system.

Referring first to FIGS. 1A and 1B, FIG. 1A shows a schematic view of a microbeam flow sensor, a side view of which is shown in FIG. 1B. The beam 1 is manufactured on a semiconductor substrate 2 and has an end electrode 3. A lower electrode (not shown) may be fabricated on the substrate below the end of the beam. FIG. 1C diagramatically represents the concept of the microbeam flow sensor. Cantilevered beams 4 and 5 are of differing length and thickness and these deflect when subjected to a flow of fluid. The longer beam 4 is less stiff and is used to measure low fluid velocities and the shorter, stiffer beam is used to measure higher velocities. In order to cover a flow range of, say, 400:1, a number of such cantilevers of varying stiffness may be used.

The deflection of any one of the beams depends on the fluid velocity and density, the shape of the beam and the elastic modulus of the beam material. Assuming the shape and elastic modulus of the beam remain unchanged, the deflection of the beam can be related to the flow by the following expression:

$$\delta \alpha \rho v^2$$

where
 $\delta$ is deflection of beam tip,
 $\rho$ is fluid density, and
 v is fluid velocity.

By measuring the deflection electrically, using capacitance techniques, the output ($OP_{\mu c}$) of the microchip flow sensor is given by the expression $$OP_{\mu c} \alpha \rho v^2 \tag{1}$$

The mass flowrate (M) of the fluid is proportional to the product of fluid density and velocity, $$M \alpha \rho v \tag{2}$$

In order to obtain the mass flowrate from the output of the microbeam flow sensor, a separate measurement of the fluid density ($\rho$) may be made.

FIG. 2 represents a system in which the microbeam flow sensor is used in conjunction with a density transducer, which enables the mass flow rate to be calculated.

A suitable density transducer is described in copending United Kingdom patent application No. 8720355, corresponding to U.S. patent application Ser. No. 07/237,808. This is based on a vibrating cantilever beam. The effective mass of a vibrating body is made up of the beam itself and a mass of the fluid around the beam. The amplitude of vibration of the beam depends on the effective mass and, because the mass of the beam is constant, any changes in amplitude can be related to a change in fluid density. Alternatively, the beam may be caused to vibrate at a particular amplitude, and any change in the amount of energy required to keep the beam vibrating at that amplitude reflects the density of the surrounding fluid.

Other characteristics of the vibration rather than amplitude may be measured. For example, the frequency may be monitored, and changes in frequency due to the surrounding fluid could be detected. Alternatively, the energy required to keep the beam vibrating at a particular frequency could be monitored.

It will be appreciated that other forms of density transducers could be used.

In FIG. 2, fluid flow is in the direction shown by the arrow 6, and a density transducer 7 and microbeam flow sensor 8 are located as shown, the density transducer being positioned in a region of substantially stationary fluid. The outputs are combined as indicated to give mass flowrate $$M = \sqrt{(\rho v^2) \times \rho}$$

of the fluid.

In a practical embodiment of a microbeam flow sensor required to work over a 400:1 flowrange and hence 160,000:1 dynamic head range (i.e. $\rho v^2$ range), at least two cantilevered beams are used; one to monitor relatively low flow rates, in the range 3.75 to 75cm$^3$s$^{-1}$ and the other to monitor higher flow rates in the range 75cm$^3$s$^{-1}$ to 1500cm$^3$s$^{-1}$. Each beam can be designed to measure over a 60:1 flowrange and in that case there will be an overlap range from approximately 22.5 to 225 cm$^3$s$^{-1}$.

The active elements in the sensor are cantilevered beams with dimensions of the order of tens of $\mu$m. Any contamination as outlined hereinbefore could therefore seriously affect the accuracy of the device. FIGS. 3A and 3B show how small amounts of contamination, whether of a particulate nature 10 (as in FIG. 3A), or in the nature of a film 11 (as in FIG. 3B), affect the streamlines around the beam 9, giving a narrow wake 12 as opposed to the wide wake 13 in the uncontaminated case, and hence affect the drag forces on the beam. This, in turn, will affect the amount of deflection of the beam for a given flow velocity and hence also the accuracy of measurement made using the beam.

A further consideration is that the primary flow sensing element in the microbeam flow sensor is analogue in nature, in that the flow is inferred from the electrical measurement of the deflection of the cantilevered beams. Such analogue electronic systems tend to drift with time.

Also, in the example described, the deflection of the beam is inferred from electrical capacitance measurement. The capacitance measurement will not only depend on the distance between the capacitor plates (i.e. the beam deflection), but also on the dielectric constant of fluid (e.g. gas) between the plates. If the fluid composition varies with time this could cause a change of dielectric constant and the evaluation of beam deflection, and hence the measured flowrate, would then be in error.

Other methods of monitoring the deflection of the beam may be used, some of these being described in European patent application No. 86309946.1 referred to hereinbefore. Other properties of the beam dependent on fluid flow past the beam may also be monitored, for example it may be used in a vibrating mode, and such properties may be used to monitor different characteristics of fluid flow. For example a hot beam sensor may be used to measure characteristics of fluid which is flowing.

The inventors have found ways of enabling a meter based on the microbeam flow sensor to "condition monitor" itself, and to recalibrate itself to counter effects of contamination and possible drift in meter accuracy and maintain accuracy over a 20 year period at least.

An in-line filter may be incorporated in a metering system upstream of the meter, to avoid gross contamination of the cantilever beams in the microbeam flow sensor and the density transducer. This filter may be designed to remove particles greater than 10 $\mu$m in diameter and a 5 $\mu$m filter would be particularly desirable.

In order to further reduce the possible effects of particulate contamination, a practical microbeam flow sensor could have three similar and preferably identical cantilevered beams to measure high flow rates and three similar and preferably identical, but more flexible, beams to measure the low flowrates. The contamination of any one beam can be isolated by comparing its output with those of the other two similar beams. The contamination of two of three similar beams can be monitored by comparing the output of all six beams in the overlap range. Alternatively, the beams can be considered in pairs, each pair consisting of a high flow and a low flow beam whose capacitances are connected in parallel. Contamination of any pair can be isolated by a voting procedure which compares the outputs of all three pairs. Such voting procedures can eliminate the effects of particulate contamination on the accuracy of the metering system, but if all three of a set of beams or, any two pairs of beams, were to become contaminated, recalibration would be necessary. Recalibration would also be necessary in the case of film contamination and changes in the dielectric constant of the metered fluid.

To reduce error due to change in the dielectric constant, a reference beam may be incorporated on the substrate of the microbeam flow sensor. The beam has fixed capacitance plates which will not vary with flow rate and so any change in capacitance of this beam would be due to a change of dielectric constant.

To achieve recalibration in this example, a true volume or velocity measuring device is required and the inventor has solved this problem by hybridising the microbeam flow sensor and density transducer with a small fluidic flowmeter.

A suitable fluidic flowmeter is described in our copending European patent application No. 87305530.5, published under No. 0 251 627, and corresponding to U.S. Pat. No. 4,838,091. A fluidic flowmeter may be amalgamated with a vortex meter.

FIG. 4 represents a fluid meter comprising a density transducer 14, a microbeam flow sensor 15 and a fluidic flowmeter 16. The fluidic meter has flow passages having larger dimensions than those of the flow sensor and density transducer. The accuracy of the fluidic meter is therefore much less affected by contamination than the microchip flow sensor. Also, the output of the fluidic meter is digital in nature (the frequency of the output is proportional to gas velocity) and is less prone to drift than that of sensors 14 and 15.

The fluidic meter alone is not suitable for measuring flow rates at the lower end of the range which the present system is required to monitor. When the flow rate is lower than that which the fluidic meter can monitor, the last measured output value (which is dependent on velocity) can be stored by a computing circuit and this value can be used for calibration purposes until a measurable flow rate is again monitored and the stored value can be updated.

FIG. 4 shows how the outputs DT of the density transducer and $\mu c$ of the microchip sensor, related to $\rho_{DT}$ and $(\rho v^2)_{\mu c}$ respectively, can be used to recalibrate the meter. Monitoring and calibration logic can be performed by processing circuits shown generally at 17, 18, 19 and 20. The frequency of oscillation of the jet within the fluidic meter is believed to be directly proportional to the fluid velocity ($v_F$) which issues from an inlet nozzle 21. By measuring these oscillations, using, for example, a cantilever microbeam or a differential pressure transducer to compare the flow in the output diffuser legs 22 and 23 of the fluidic meter, the output, F, of the fluidic meter can be related to the fluid velocity $v_F$. Squaring this output in circuit 17 and multiplying it in circuit 18 with the output DT of the density transducer, an independent estimate of the dynamic head ($\rho_{DT} v_F^2$) is obtained over the flow range of the fluidic meter. This output is then compared in comparison circuit 19 with the dynamic head measured by the microbeam flow sensor 15 $(\rho v^2)_{\mu c}$, the result being compared in circuit 20 with a set value from an initial calibration. If this result is the same as the set value, then recalibration is not required but a difference can be indicated by an error signal which may be used for recalibration. In this way, the condition and performance of the meter may be monitored and the calibration may be adjusted as necessary.

The fluid meter may for reasons of economy desirably include three microchips, each including a number of cantilever microbeams of varying stiffnesses as sensors, each set of microbeams being respectively arranged for use as a flow sensor, a density sensor and a fluidic frequency sensor. The fluidic frequency sensor beam could be engineered to be bi-directional.

Although the specific embodiment described is directed at providing a measurement of mass flowrate for a metered fluid, it is possible to monitor other fluid characteristics and calibrate the system in a similar way by comparing the outputs of the monitoring devices. It will be appreciated that calibration of a meter is achieved by comparing measurements from at least two metering or sensing devices and is particularly applicable when one of the devices is able to monitor lower flow rates.

Silicon chip/microbeam technology, which is applicable to this invention, is advantageous in terms of large turndown ratio, low cost, small size and low power consumption. A readout may be given in terms of mass flow or volume. The fluidic principle used in the fluidic flowmeter gives the advantages of digital output, simplicity of construction, tolerance of particulate contamination and no moving parts.

Although the metering system of the present invention is described generally in relation to metering of fluids (liquids or gases), in general, it is particularly, though not exclusively, applicable for use in domestic gas metering.

An example of a fluid metering system according to the invention may also include such components as an in-line filter, and a flow regulator. Other components, for example a thermal cut-off valve and a manual stop cock may also be included in the system, as appropriate.

A fluid meter, such as that described hereinbefore by reference to FIGS. 1 to 4, may be incorporated in the main flow channel or preferably in a bypass channel of the system to carry out measurements. A precisely known percentage of the total flow passes along the bypass so that measurements made in the bypass channel can be related to the total flow. Other possibilities exist, for example the meter could be included in a by-pass of a bypass channel.

FIG. 5 represents diagramatically the flow channels through one example of a fluid metering system, fluid being routed, via an in-line filter 24, along a main flow channel 25 and along a by-pass channel 26 which, as will be described hereinafter, incorporates a fluid meter in accordance with the present invention. 10% of the flow is diverted through the bypass and the inline filter is incorporated in order to avoid gross contamination of the flow channels.

FIG. 6 shows a perspective view of a modular metering installation suitable for use in a domestic gas supply, and FIG. 7 shows a cross-sectional view through the metering installation. The installation comprises a number of modular components which are arranged and assembled in a suitable casing. A control valve referenced generally at 27 includes a thermal cut-off valve, an example of which is the subject of our copending United Kingdom patent application No. 87 20358, published under U.S. Pat. No. 2,209,200 and which is also described in brief hereinafter. The control valve also includes a stop cock.

The stop cock has a rotatable plug in cooperation with a body, the plug having a fluid passage extending through it. Rotation of the plug allows control of fluid flow, and sealing of the stop cock plug to the body is assisted by resilient means such as a circlip which compresses the plug against sealing rings such as "O" ring seals.

The thermal cut-off valve effects automatic shut-off of fluid flow in response to an ambient temperature greater than a predetermined value. This can be such that the fluid flow is shut off in a fire situation. The valve includes a component which undergoes a dimensional change if the ambient temperature exceeds the predetermined value and the dimensional change may be irreversible. The component may be made of memory metal, for example a shape memory effect spring which undergoes an irreversible expansion if the ambient temperature exceeds the predetermined value.

An in-line regulator referenced at 28 may be of the type well known in the art which responds to the inlet pressure, at the outlet of control valve 27, to produce a substantially stable operating pressure within the system. Filter 29 is located between the control valve 27 and the inlet to the regulator 28. A fluid flow metering unit referenced generally at 30 comprises a main channel 31 including a throated section or venturi 32 and a bypass channel 33 incorporating a fluid flow meter.

Referring to FIGS. 6 and 7, fluid enters an inlet 34 and passes successively through control valve 27, regulator 28 and into the metering unit 30. Typically 10% of the total fluid (indicated by arrow A) flows through the bypass channel 33 and 90% flows along the part of the main channel indicated by 35. The main channel has a venturi 32 and fluid is accelerated through the venturi to draw in the flow from the bypass by a suction effect. The 10% recovered from the bypass and the expansion of fluid on the downstream side of the venturi gives a pressure drop across the whole metering unit which is significantly less than that across the bypass. For example, a differential pressure of at least two times that allowed across the complete metering unit can be generated across the bypass. This greater differential pressure allows a much smaller fluidic meter to be used in the bypass which in turn gives a much higher frequency output. The metering unit will therefore be more sensitive when measuring unsteady domestic gas flowrates, for example. The pressure drop across the whole metering unit is typically less than 2 millibars.

In the illustrated embodiment, the fluid meter 36 located in the bypass channel is a fluid meter according to the present invention, including a density transducer 37, a microbeam flow sensor 38 and a fluidic flowmeter 39 together with associated recalibration circuitry which may be contained within the installation or located externally. The density transducer 37 is located in a dead zone in the bypass, containing substantially stationary fluid, and is surrounded by a fine filter 40 (e.g. a 3 $\mu$m filter) so that the fluid around it is substantially stationary. An air foil 41 (which can be seen in FIG. 6) increases the velocity of the fluid (typically to greater than 20 cm/s) so that the beam technology works more effectively. The fluidic flowmeter illustrated has 90° bends in the outlet paths indicated by 42 which return the fluid to the main channel.

The venturi shown in FIGS. 6 and 7 may be secured in position by a web. Electronic circuitry and batteries can be included in the meter casing 43, and sealed so there are no bare contacts. 'O' ring seals may be used to prevent fluid leaks (this is especially important in the case of inflammable liquids and gases), and the casing can be vented by holes or by the porosity of a plastics material used to construct the casing.

The meter can be read through a window, by remote metering or using a suitable Mainsborne system.

Locating the microbeam flow sensor and density transducer in the bypass channel further protects them from contamination. The main flow channel will be self cleaning, having a flat bottom to avoid debris build-up. The change in flow direction for the bypass causes most of the particulate matter (i.e. particles > 10 $\mu$m in diameter) to pass directly through the main channel and, in the case of domestic gas metering, to the burners.

There is a gravity filter 44 positioned at the inlet of metering unit 30 which reduces fluid velocity and causes any large fluid-borne debris to drop back into the main flow.

As an alternative to the gravity filter, a diffuser consisting of a series of vanes may be placed at the inlet to the metering unit. The diffuser can replace the gravity filter as a means to cause particles > 125 $\mu$m (for example) to fall out of the flow so that the jet does not carry debris.

The modular construction can be thought of as two blocks—a fluid flow metering unit block and a block comprising the control valve and regulator. A domestic gas meter installation of this construction can be designed to replace two housebricks, the installation being approximately 1/6 the size of meter boxes currently used. Including inlet and outlet pipes, the total volume of the installation could correspond to the volume of three housebricks. The compact components of the current invention allow such a compact modular construction.

Although, in the illustrated embodiment, the fluid metering system includes a specific example of a meter (which is the subject of patent application No. 237,389 as mentioned hereinbefore), it will be understood that the system according to the present invention encompasses other meters which may or may not be located in a bypass channel.

We claim:
1. A fluid metering system comprising:
   an inlet for receiving fluid to be metered;
   an outlet for said fluid;
   a main flow channel extending between the inlet and the outlet, said main flow channel including a venturi;
   a bypass channel having an inlet connected to the main flow channel upstream of the venturi and an outlet communicating with said main flow channel within the venturi, whereby the pressure drop between the inlet and the outlet of the bypass channel is greater than the pressure drop between the inlet and the outlet of the main flow channel;
   flow monitoring means disposed in the bypass channel for monitoring the flow of fluid therethrough; and
   output means responsive to said flow monitoring means to produce an output representative of the total amount of said fluid flowing through the metering system;
   wherein said flow monitoring means comprises at least one microbeam sensor formed by micromachining in a semiconductor substrate wherein a beam is displaced by the fluid flow.

2. A fluid metering system according to claim 1, wherein said flow monitoring means further comprises a density transducer, and wherein said output means is arranged to combine an output from said density transducer with an output from said microbeam flow sensor to provide an output representative of the mass flow rate of said fluid.

3. A fluid metering system as claimed in claim 2, wherein said density transducer comprises a microbeam density sensor formed by micromachining in a semiconductor substrate.

4. A fluid metering system according to claim 1, wherein said flow monitoring means further comprises a fluidic flowmeter disposed in flow series with said microbeam flow sensor, and wherein said output means is arranged to correct the output of the metering system in dependence upon differences between the respective outputs of the microbeam flow sensor and the fluidic flowmeter.

5. A fluid metering system as claimed in claim 1, wherein the system comprises at least two interconnected modules, comprising a first module containing the main flow channel, the venturi, the bypass channel and the flow monitoring means, and a second module containing a pressure regulator and a control valve.

* * * * *